June 12, 1923.

W. E. BROBST, JR 1,458,872

FOOD MACHINE

Filed Aug. 26, 1920

3 Sheets-Sheet 1

Inventor
William E. Brobst Jr,

By Hood & Schley.

Attorney

June 12, 1923.

W. E. BROBST, JR 1,458,872

FOOD MACHINE

Filed Aug. 26, 1920

3 Sheets-Sheet 2

Inventor
William E. Brobst Jr.

By
Hood & Schley,
Attorneys

June 12, 1923.
W. E. BROBST, JR
1,458,872
FOOD MACHINE
Filed Aug. 26, 1920
3 Sheets-Sheet 3
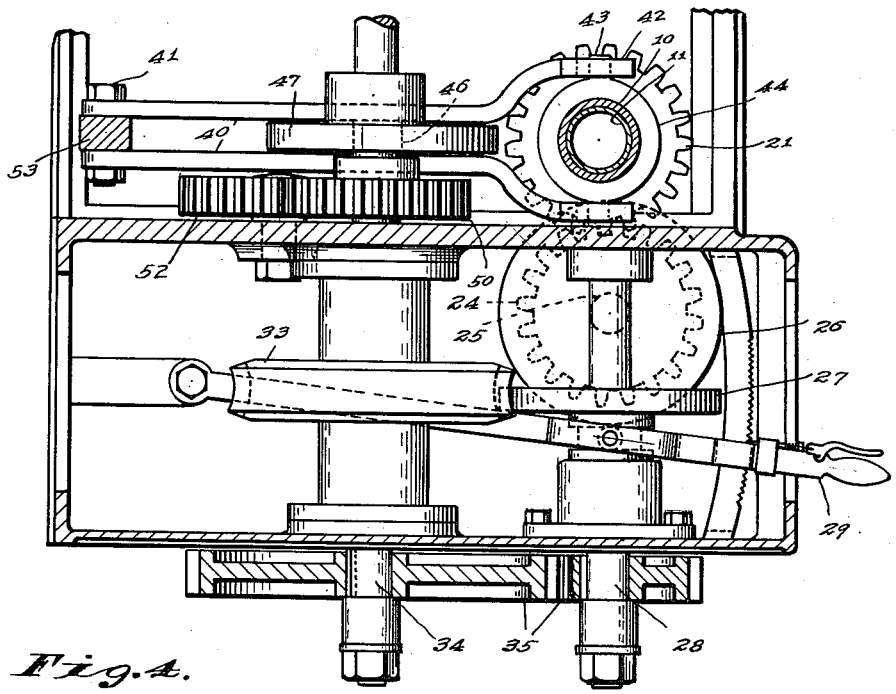
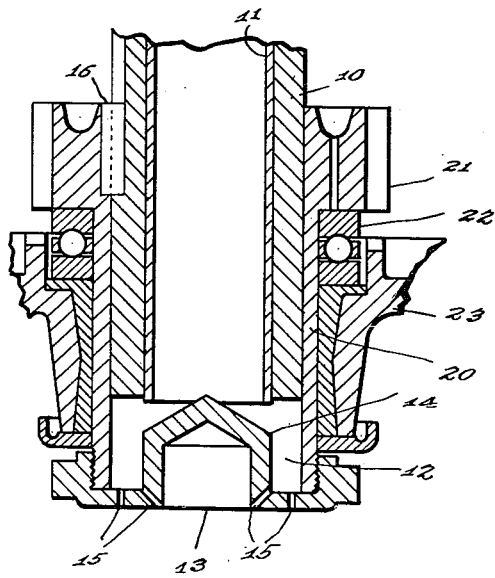
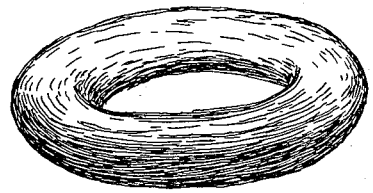
Inventor
William E. Brobst, Jr.
By Hood & Schly
Attorneys Patented June 12, 1923.

1,458,872

UNITED STATES PATENT OFFICE.

WILLIAM E. BROBST, JR., OF NOBLESVILLE, INDIANA.

FOOD MACHINE.

Application filed August 26, 1920. Serial No. 406,067.

*To all whom it may concern:*

Be it known that I, WILLIAM E. BROBST, Jr., a citizen of the United States, residing at Noblesville, in the county of Hamilton and State of Indiana, have invented a new and useful Food Machine, of which the following is a specification.

It is the object of my invention to produce a food product built up of coiled shreds, by reason of which a better cooking is obtained, with the production of crust all through the product instead of merely on the surface, and no hard edges such as a knife-cut product has are found, and which may be circular in form, such as doughnut or a pie, so it fits easily within a round bowl; and to provide a machine for producing such a food product.

I have illustrated my invention in a preferred form. The machine will produce a coiled-shred food product, circular or oval, either with or without a central hole as desired, and is primarily adapted to use grain, preferably partly cooked, for producing the shreds, though the use of such grain is not essential to my invention in its broader aspect.

Figure 1:
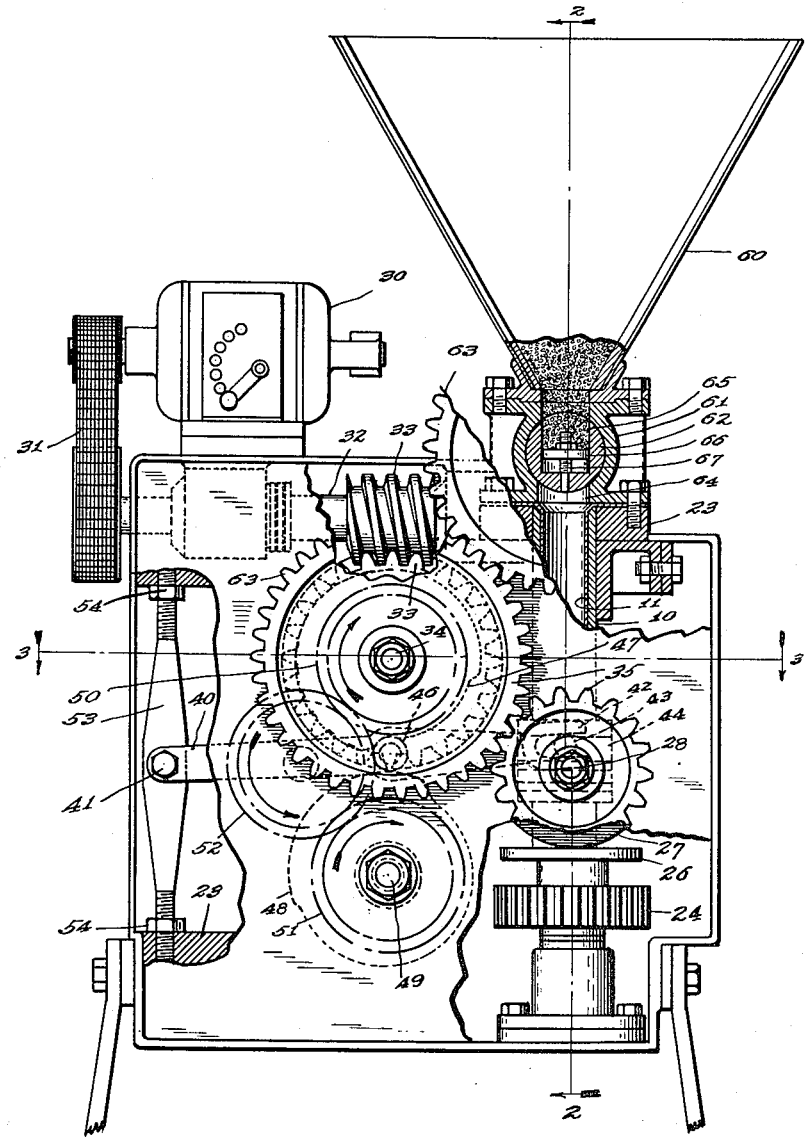
Figure 2:
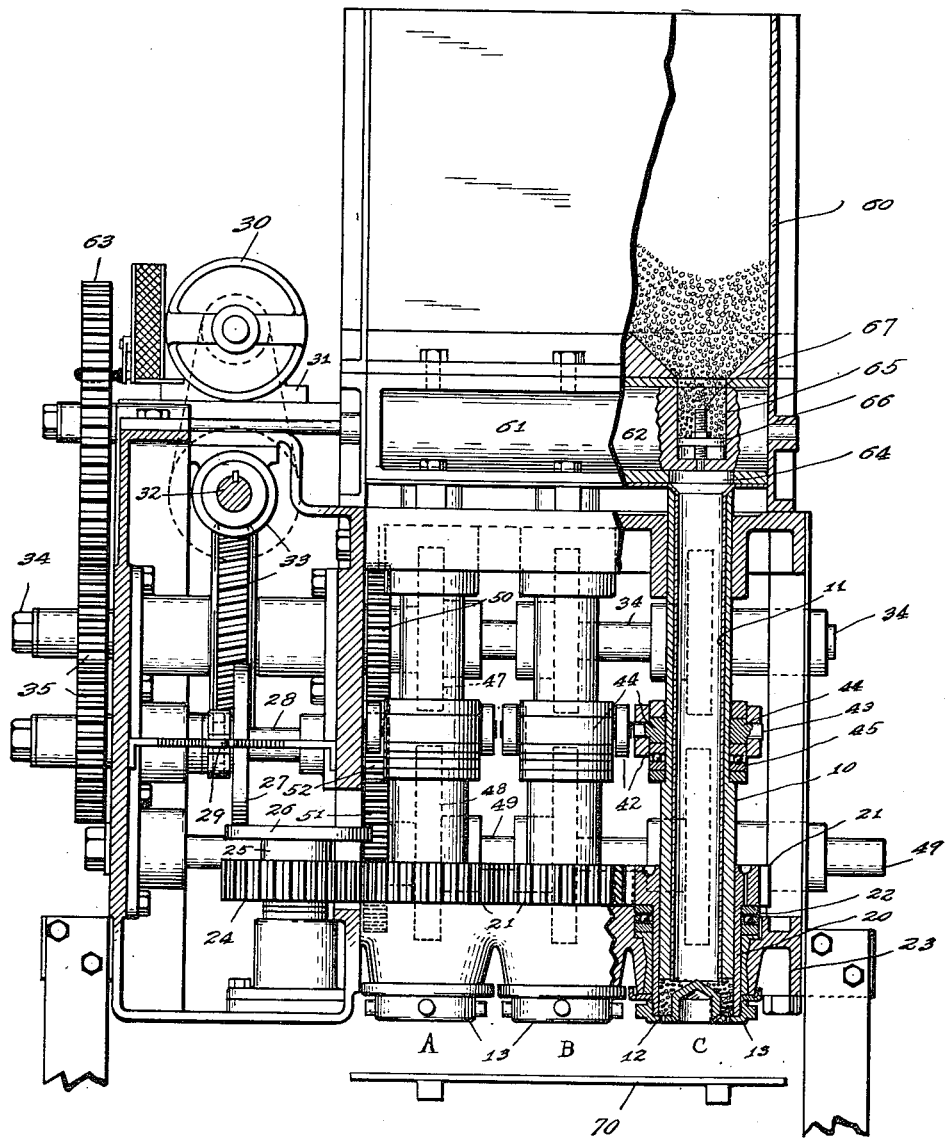

The accompanying drawings illustrate my invention in such preferred form. In such drawings, Fig. 1 is a side elevation of a food machine embodying my invention, with some of the parts broken away and in section; Fig. 2 is a front elevation in partial section on the line 2—2 of Fig. 1; Fig. 3 is a partial section on the line 3—3 of Fig. 1; Fig. 4 is an enlarged section through the lower part of one of the expressing units; and Fig. 5 is a perspective view of a doughnut-shaped product made up of coiled shreds by the machine shown in the remaining views.

The machine may have any desired number of expressing units, three sets of units, A, B, and C, being shown. Each unit makes a complete coiled-shred product. Each unit comprises a vertically reciprocable hollow plunger 10, hollow to permit the initial material, such as the grain, to be fed through it. If desired, the hollow plunger 10 may have a sliding fit over a stationary tube 11, which are conveniently supported from their upper ends as shown in Figs. 1 and 2 and through which the material actually slides. When the plunger rises, the material fed through it and through the tube 11 falls into an annular space 12 provided in a rotatable annular die 13, and any material adhering to the plunger is scraped off by the tube 11, which projects below the plunger 10 when the latter is at the upper limit of its movement. When the plunger 10 descends, it isolates a mass of this material in the space 12 when it passes below the corner 14 on an upwardly extending central boss of the die 13, so that the further downward movement of the plunger beyond the corner 14 presses this isolated mass of grain through holes 15 in the bottom of the die 13, the extruded material coming out in the form of shreds. The holes 15 may be in any desired arrangement and number, according to the character of the product desired: to produce a holeless product, such as a pie bottom or pie crust, some of the holes 15 project obliquely inward from the lower part of the angular space 12, as is shown in Fig. 4; while if these inwardly projecting holes are omitted or plugged the product will have a central hole, such as in a doughnut; and if the holes near the outer edge are greater in number than elsewhere the product will have an external upstanding flange, like a pie bottom or a patty shell. During the operation the die 13 is kept in constant rotation, and preferably the plunger 10 rotates with it, as by being connected thereto by a spline 16, making any desired number of rotations during the formation of a single food product, depending upon the number of layers of shreds desired therein. The amount of shredded matter discharged from the die may be controlled by varying the distance by which the plunger 10 descends below the corner 14; when such descent stops the extrusion of shreds also stops, and when the plunger 10 begins to rise the suction created cuts off the extruded shreds without requiring any knife.

The die 13 of each unit is carried by a supporting sleeve 20, provided at the top with a gear 21 which serves both as a driving gear and as a flange whereby such sleeve 20 is supported on thrust bearings 22 in the main frame 23. The gears 21 of adjacent units intermesh, and that of unit A meshes with a similar gear 24 on a vertical shaft 25, so that when the shaft 25 is driven the dies 13 of all the units are rotated, those of adjacent units rotating in opposite directions with this arrangement. Thus some of the units produce right-hand coils and some left-hand coils; but this is immaterial. The speed of the shaft 25 is preferably variable;

in the arrangement shown this is obtained by providing a friction disk 26 at the upper end of the shaft, across the face of which disk a driving friction wheel 27 mounted on a shaft 28 is movable by a lever 29. The shaft 28 is driven from any desired source of power, which in the arrangement shown is an electric motor 30 connected by a chain 31 to a shaft 32, which in turn is connected through worm gearing 33 to a main power shaft 34 extending behind all the expressing units, which shaft 34 is connected to the shaft 28 by gearing 35. Thus the speed of rotation of the dies 13 with respect to that of the shaft 34 is variable by the lever 29.

The vertical reciprocation of the plunger 10 is obtained by levers 40. These levers are made of two parallel connected parts, as is clear from Fig. 3; and each lever is pivoted at one end on a pivot pin 41, and operates through forks 42 at the other end on projecting pins 43 from a collar 44 loosely surrounding and axially fixed relatively to the associated plunger 10. The vertical movement of the collar 44 correspondingly raises or lowers such associated plunger, the downward push from the collar to the plunger being transmitted through thrust bearings 45. At an intermediate point the lever 40 is provided with a roller 46 located between its two parallel parts and connecting such parts. The roller 46 of each lever is located between a cam 47 on the shaft 34 and a mating cam 48 on a shaft 49 which parallels the shaft 34 and is driven therefrom through similar gears 50 and 51 on such two shafts, and an idler gear 52 meshing with both the gears 50 and 51, so that the shafts 34 and 49 rotate at the same speed in the same direction and the cams 47 and 48 move past the associated roller 46 in opposite directions and so both tend to rotate in the same direction. The cams 47 and 48 are of the proper shape to produce the desired vertical oscillation of the lever 40, and in consequence produce the desired reciprocation of the associated plunger 10. The pivot pin 41 is carried by a vertical bar 53 slidable at both ends in holes in the main casing 23 and vertically adjustable by nuts 54 to raise or lower the pivot pin 41 and thus lower or raise the entire stroke of the associated plunger 10.

In order to supply the tube 11 with the grain, a hopper 60 is provided extending over the upper ends of such tubes, and a suitable feed mechanism is interposed between the hopper and the tubes. This feed mechanism comprises a casing 61 mounted upon the main frame 23 and supporting the hopper 60. A rotatable cylinder 62 fits rotatably within the casing 61 and is driven from the shaft 34 by suitable intermeshing gears 63 of equal size so that the cylinder 62 is rotated in synchronism with the reciprocation of the plungers 10. The casing 62 is provided with a vertical opening 64 through it above each tube 11, which opening communicates both with such tube and with the hopper 60; but grain is allowed to pass from the hopper 60 to the tube only as the cylinder 62 is rotated. The cylinder 62 is provided with a series of lateral pockets 65, which do not pass through the cylinder and thus are open at only one end. As the cylinder 62 rotates the open ends of the pockets 65 are brought alternately into communication with the hopper, to receive charges of grain therefrom, and with their respective tubes 11, to dump such charges into the tubes. The size of the charge thus dumped is dependent upon the size of the pocket; and the size of the pocket is variable by making the bottom of the pocket of a disk 66 mounted on a screw-threaded post 67 extending into the pocket from the unopen end thereof and fixed in the cylinder 62, so that by screwing the disk 66 up and down on the post 67 the depth of the pocket may be varied.

In operation, the motor 30 drives the shafts 34 and 49 to reciprocate the plungers 10 vertically, to rotate the cylinder 62 in synchronism with the reciprocation of the plungers, and to rotate the dies 13 with their plungers 10. During the rotation of the cylinder 62, the pockets 65 alternately receive charges of grain and dump such charges into the associated tubes 11. These charges fall through the tubes 11 onto the central bosses of the rotating dies 13, and when the plungers 10 are raised these charges are fed into the annular spaces 12 of such dies. The size of the charges is controlled by adjusting the disks 66. By reason of the synchronism referred to, a charge is fed into the space 12 of each die each time the associated plunger 10 rises. When a plunger descends it enters the annular space 13, and presses the isolated grain therein out through the openings 15 in the rotating die 13. The grain is extruded from the openings 15 in the form of shreds, and these shreds are deposited on any suitable receiver, such as a board 70 (Fig. 2), and coiled on such board by reason of the rotation of the die. The deposited coil of shreds may be distributed evenly or unevenly, and may be formed with a hole in the center or without such hole, as desired, the holes 15 being properly arranged to give the desired result. The extrusion of shreds ceases when the descent of the plunger 10 ceases, and the immediately following rising of the plunger 10 cuts off the shreds at the mouths of the holes 15 without the necessity for any knife.

The board 50 may be fed forward in any desired manner to receive successive deposits of coil shreds at different places; and these deposits may be cooked or otherwise treated in any suitable manner, depending upon the nature of the final product desired.

I claim as my invention:

1. A machine for producing coiled-shred food-products, comprising a rotatable die having holes therethrough, and a plunger reciprocable in said die and rotatable therewith to force out in the form of shreds through the holes in the die material supplied to the die, so that by the rotation of the die such shreds are deposited in coils.

2. A machine for producing coiled-shred food-products, comprising a rotatable die having holes therethrough, and a plunger reciprocable in said die to force out in the form of shreds through the holes in the die material supplied to the die, so that by the rotation of the die such shreds are deposited in coils.

3. In a machine for producing coiled-shred food-products, the combination of a rotatable die having an annular space, said die being provided with outlet holes leading from said annular space, a hollow plunger rotatable with said die and reciprocable with relation to said die into and out of such annular space to intermittently isolate it, and means for supplying food material to said annular space when such plunger is withdrawn therefrom, so that as the die rotates and the plunger enters into such annular space the material in such annular space is forced out through such holes in the form of shreds which are deposited in coils by the rotation of the die.

4. In a machine for producing coiled-shred food-products, the combination of a rotatable die having an annular space, said die being provided with outlet holes leading from said annular space, and a hollow plunger rotatable with said die and reciprocable with relation to said die into and out of such annular space to intermittently isolate it, so that as the die rotates and the plunger enters into such annular space the material in such annular space is forced out through such holes in the form of shreds which are deposited in coils by the rotation of the die.

5. In a machine for producing coiled-shred food-products, the combination of a rotatable die having an annular space, said die being provided with outlet holes leading from said annular space, a hollow plunger reciprocable with relation to said die into and out of such annular space to intermittently isolate it, and means for supplying food material to said annular space when such plunger is withdrawn therefrom, so that as the die rotates and the plunger enters into such annular space the material in such annular space is forced out through such holes in the form of shreds which are deposited in coils by the rotation of the die.

6. In a machine for producing coiled-shred food-products, the combination of a rotatable die having an annular space, said die being provided with outlet holes leading from said annular space, and a hollow plunger reciprocable with relation to said die into and out of such annular space to intermittently isolate it, so that as the die rotates and the plunger enters into such annular space the material in such annular space is forced out through such holes in the form of shreds which are deposited in coils by the rotation of the die.

7. A machine for producing coiled-shred food-products, comprising a rotatable die having an annular space provided with outlet holes, a hollow plunger rotatable with said die and reciprocable out of and into said space alternately to permit food material to be supplied to said space and to press said material out through said outlet holes in the form of shreds, and feeding mechanism operable synchronously with the reciprocation of said plunger for supplying a charge of food material therethrough to said annular space upon each complete reciprocation of the plunger.

8. A machine for producing coiled-shred food-products, comprising a rotatable die having an annular space provided with outlet holes, a hollow plunger reciprocable out of and into said space alternately to permit food material to be supplied to said space and to press said material out through said outlet holes in the form of shreds, and feeding mechanism operable synchronously with reciprocation of said plunger for supplying a charge of food material therethrough to said annular space upon each complete reciprocation of the plunger.

9. A machine for producing coiled-shred food-products, comprising a rotatable die having holes therethrough, a plunger reciprocable in said die and rotatable therewith to force out in the form of shreds through the holes in the die material supplied to the die, so that by the rotation of the die such shreds are deposited in coils, and means for varying the speed of rotation of the die and plunger with relation to the speed of reciprocation of the plunger.

10. A machine for producing coiled-shred food-products, comprising a rotatable die having holes therethrough, a plunger reciprocable in said die to force out in the form of shreds through the holes in the die material supplied to the die, so that by the rotation of the die such shreds are deposited in coils, and means for varying the speed of rotation of the die with relation to the speed of reciprocation of the plunger.

In witness whereof, I have hereunto set my hand at Indianapolis, Indiana, this 19th day of August, A. D. one thousand nine hundred and twenty.

WILLIAM E. BROBST, Jr.